(12) United States Patent
Lu et al.

(10) Patent No.: US 11,425,710 B2
(45) Date of Patent: Aug. 23, 2022

(54) MULTIPLE ACCESS TECHNOLOGIES IN A NEW RADIO SYSTEM

(71) Applicant: Sony Corporation, Tokyo (JP)

(72) Inventors: Penshun Lu, Beijing (CN); Wenbo Zhang, Beijing (CN); Tao Cui, Beijing (CN); Jianfei Cao, Beijing (CN); Xin Guo, Beijing (CN); Chen Sun, Beijing (CN)

(73) Assignee: SONY CORPORATION, Tokyo (JP)

( * ) Notice: Subject to any disclaimer, the term of this patent is extended or adjusted under 35 U.S.C. 154(b) by 68 days.

(21) Appl. No.: 17/040,991

(22) PCT Filed: May 9, 2019

(86) PCT No.: PCT/CN2019/086187
§ 371 (c)(1),
(2) Date: Sep. 24, 2020

(87) PCT Pub. No.: WO2019/218925
PCT Pub. Date: Nov. 21, 2019

(65) Prior Publication Data
US 2021/0099986 A1   Apr. 1, 2021

(30) Foreign Application Priority Data
May 16, 2018 (CN) .......................... 201810468999.0

(51) Int. Cl.
*H04W 72/04* (2009.01)
*H04L 5/00* (2006.01)
*H04W 72/00* (2009.01)

(52) U.S. Cl.
CPC ......... *H04W 72/044* (2013.01); *H04L 5/0005* (2013.01); *H04W 72/005* (2013.01)

(58) Field of Classification Search
CPC . H04W 72/044; H04W 72/005; H04W 28/16; H04W 72/00; H04L 5/0005
See application file for complete search history.

(56) References Cited

U.S. PATENT DOCUMENTS

2015/0126207 A1   5/2015 Li et al.
2016/0352551 A1*  12/2016 Zhang .................. H04L 5/0007
(Continued)

FOREIGN PATENT DOCUMENTS

CN   105848165 A   8/2016
CN   107734710 A   2/2018
(Continued)

OTHER PUBLICATIONS

International Search Report and Written Opinion dated Aug. 13, 2019 for PCT/CN2019/086187 filed on May 9, 2019, 8 pages including English Translation of the International Search Report.

*Primary Examiner* — Ian N Moore
*Assistant Examiner* — Latresa A McCallum
(74) *Attorney, Agent, or Firm* — Xsensus LLP

(57) ABSTRACT

The present disclosure provides an electronic apparatus and method for wireless communication and a computer-readable storage medium. The electronic apparatus comprises: a processing circuit, configured to: determine a signature in a multiple access signature pool to be used for user equipment in which the electronic apparatus is located, wherein the multiple access signature pool is divided into multiple sub-signature pools according to a communication system parameter, and the determined signature belongs to a sub-signature pool corresponding to the communication system parameter used for the user equipment; and using, on the basis of the determined signature, a multiple access time-frequency resource to perform transmission, wherein the multiple access time-frequency resource is shared by a group of user equipment comprising the above user equipment.

16 Claims, 11 Drawing Sheets

(56) References Cited

U.S. PATENT DOCUMENTS

2016/0353452 A1\* 12/2016 Chen .................... H04J 11/0056
2016/0353476 A1\* 12/2016 Sartori ................. H04L 5/0005
2018/0227903 A1\* 8/2018 Uchiyama ............. H04W 72/04

FOREIGN PATENT DOCUMENTS

| WO | WO-2016153555 A1 \* | 9/2016 | ............. H04J 15/00 |
| WO | WO-2017209570 A1 \* | 12/2017 | |
| WO | WO-2018028434 A1 \* | 2/2018 | ........... H04B 7/0452 |
| WO | WO-2019195241 A1 \* | 10/2019 | ........... H04L 1/0009 |

\* cited by examiner

| $\mu$ | $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

MULTIPLE ACCESS TECHNOLOGIES IN A NEW RADIO SYSTEM

CROSS-REFERENCE TO RELATED APPLICATIONS

The present application is based on PCT filing PCT/CN2019/086187, filed May 9, 2019, which claims priority to Chinese Patent Application No. 201810468999.0, filed May 16, 2018 with the China National Intellectual Property Administration, each of which is incorporated herein by reference in its entirety.

FIELD

The present disclosure relates to the technical field of wireless communications, in particular to multiple access technologies in a new radio communication system. More particularly, the present disclosure relates to an electronic apparatus and a method for wireless communications as well as a computer-readable storage medium.

BACKGROUND

As a next generation of radio access scheme of Long Term Evolution (LTE), New Radio (NR) is a radio access technology (RAT) different from the LTE. NR is an access technology applicable to various use cases such as Enhanced mobile broadband (eMBB), Massive machine type communications (mMTCs) and Ultra reliable and low latency communications (URLLCs).

Due to the new features of NR such as a wider bandwidth and flexible configuration, a concept of Bandwidth Part (BWP) is introduced in NR. In particular, some of user equipment (UE) may not need or cannot support such a wide bandwidth, so the UE may only use a part of the bandwidth with the BWP technology, thereby improving the flexibility and compatibility of the system. Moreover, energy consumption of the UE can be reduced with the BWP technology.

At present, the BWP technology includes two kinds of forms: grant-based scheduling and grant-free scheduling. In the grant-based scheduling, the BWP is configured for an individual UE. For example, the UE first finds a corresponding Slot Format Indicator (SFI) from a Group-Common Physical Downlink Control Channel (GC-PDCCH), and then acquires Downlink Control Information (DCI) from a PDCCH for the UE, so as to activate a BWP for the UE. Here, the DCI is equivalent to an uplink scheduling grant. In the grant-free scheduling, the UE is not required to acquire an uplink scheduling grant when performing uplink transmission. Positions of time frequency resources to be used by the UE are configured by Radio Resource Control (RRC) signaling or L1 signaling.

SUMMARY

In the following, an overview of the present disclosure is given simply to provide basic understanding to some aspects of the present disclosure. It should be understood that this overview is not an exhaustive overview of the present disclosure. It is not intended to determine a critical part or an important part of the present disclosure, nor to limit the scope of the present disclosure. An object of the overview is only to give some concepts in a simplified manner, which serves as a preface of a more detailed description described later.

An electronic apparatus for wireless communications is provided according to an aspect of the present disclosure. The electronic apparatus includes processing circuitry. The processing circuitry is configured to: determine a signature to be used for user equipment where the electronic apparatus is located among a multiple access signature pool, wherein the multiple access signature pool is divided into multiple sub signature pools based on communication system numerology; and the determined signature belongs to a sub signature pool corresponding to communication system numerology for the user equipment; and transmit, based on the determined signature, using multiple access time frequency resources, wherein the multiple access time frequency resources are shared by a group of user equipment including the user equipment.

A method for wireless communications is provided according to another aspect of the present disclosure. The method includes: determining a signature to be used for user equipment among a multiple access signature pool, wherein the multiple access signature pool is divided into multiple sub signature pools based on communication system numerology; and the determined signature belongs to a sub signature pool corresponding to communication system numerology for the user equipment; and transmitting, based on the determined signature, using multiple access time frequency resources, wherein the multiple access time frequency resources are shared by a group of user equipment including the user equipment.

An electronic apparatus for wireless communications is provided according to an aspect of the present disclosure. The electronic apparatus includes processing circuitry. The processing circuitry is configured to: divide, based on communication system numerology, a multiple access signature pool into multiple sub signature pools; and determine, among a sub signature pool corresponding to communication system numerology for user equipment, a signature to be used for the user equipment, wherein the user equipment transmits, based on the determined signature, using multiple access time frequency resources. The multiple access time frequency resources are shared by a group of user equipment including the user equipment.

A method for wireless communications is provided according to an aspect of the present disclosure. The method includes: dividing, based on communication system numerology, a multiple access signature pool into multiple sub signature pools; and determine, among a sub signature pool corresponding to communication system numerology for user equipment, a signature to be used for the user equipment, wherein the user equipment transmits, based on the determined signature, using multiple access time frequency resources. The multiple access time frequency resources are shared by a group of user equipment including the user equipment.

According to other aspects of the present disclosure, there are further provided computer program codes and computer program products for implementing the methods for wireless communications above, and a computer readable storage medium having recorded thereon the computer program codes for implementing the methods for wireless communications described above.

With the electronic apparatus and the method according to the present disclosure, a multiple access signature pool is divided into multiple sub signature pools based on communication system numerology, so that user equipment sharing one resource pool through multiple access can select an appropriate signature.

These and other advantages of the present disclosure will be more apparent by illustrating in detail a preferred embodiment of the present disclosure in conjunction with accompanying drawings below.

BRIEF DESCRIPTION OF THE DRAWINGS

To further set forth the above and other advantages and features of the present disclosure, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present disclosure and should not be construed as a limitation to the scope of the disclosure. In the accompanying drawings.

DETAILED DESCRIPTION OF EMBODIMENTS

An exemplary embodiment of the present disclosure will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present disclosure due to unnecessary details, only a device structure and/or processing steps closely related to the solution according to the present disclosure are illustrated in the accompanying drawing, and other details having little relationship to the present disclosure are omitted.

First Embodiment

Figure 1:
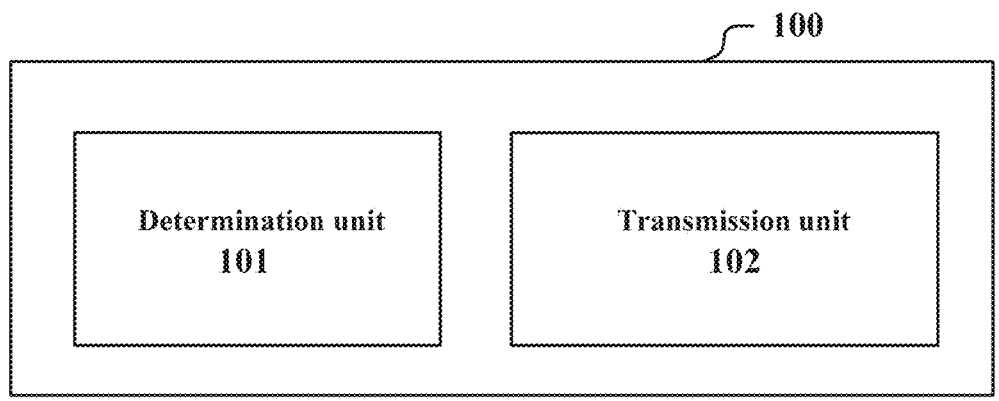
FIG. 1 is a block diagram showing function modules of an electronic apparatus for wireless communications according to an embodiment of the present disclosure.

FIG. 1 is a block diagram showing function modules of an electronic apparatus 100 for wireless communications according to an embodiment of the present disclosure. As shown in FIG. 1, the electronic apparatus 100 includes a determination unit 101 and a transmission unit 102. The determination unit 101 is configured to determine a signature to be used for user equipment where the electronic apparatus 100 is located among a multiple access signature pool. The multiple access signature pool is divided into multiple sub signature pools based on communication system numerology. The determined signature belongs to a sub signature pool corresponding to communication system numerology for the user equipment. The transmission unit 102 is configured to transmit, based on the determined signature, using multiple access time frequency resources. The multiple access time frequency resources are shared by a group of user equipment including the user equipment.

The determination unit 101 and the transmission unit 102 may be implemented by one or more processing circuitry. The processing circuitry may be implemented as, for example, a chip. Further, it should be understood that the above function units in the apparatus shown in FIG. 1 are only logical modules divided based on specific functions implemented by the function units, and are not intended to limit specific embodiments.

The electronic apparatus 100, for example, may be arranged at user equipment (UE) side or may be communicatively connected to the UE. Here, it should further be noted that the electronic apparatus 100 may be implemented at a chip level, or may be implemented at an apparatus level. For example, the electronic apparatus 100 may operate as the user equipment itself, and may further include external apparatus such as a memory and a transceiver (not shown in the drawings). The memory may be configured to store programs required to be executed by the user equipment and related data information for implementing various functions. The transceiver may include one or more communication interfaces to support communication with different apparatus (such as a base station, other user equipment, or the like). An implementation form of the transceiver is not specifically limited herein.

In this embodiment, the BWP is configured for a group of user equipment. The base station does not perform uplink scheduling grant, that is, there is no step of the UE acquiring DCI from a PDCCH of itself, and RRC signaling or L1 signaling does not specify a position of time frequency resources. On the contrary, this group of UE uses resources in the BWP in a manner based on competition.

For example, the determination unit 101 may acquire information of multiple access time frequency resources shared by a group of UE via a GC-PDCCH. Alternatively, the determination unit 101 may acquire information of multiple access time frequency resources shared by a group of UE via RRC signaling.

Figure 2:
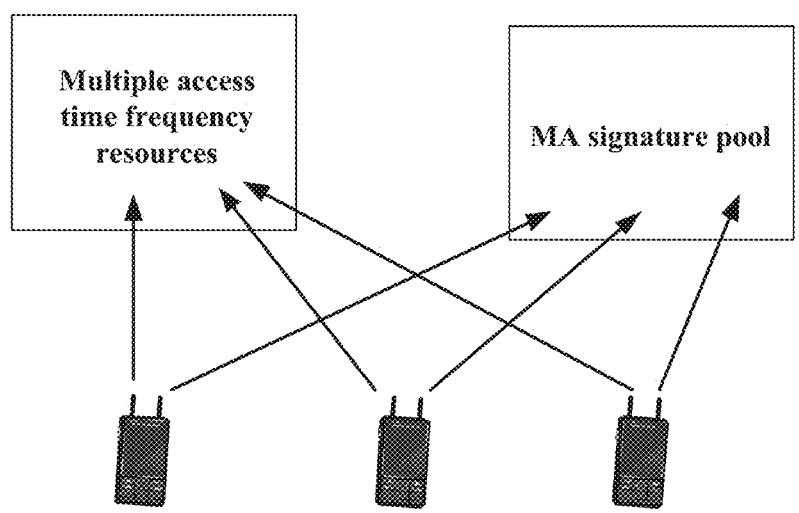
FIG. 2 is a schematic diagram showing a group of UE acquiring multiple access signatures among a multiple access signature pool and sharing multiple access time frequency resources for transmission.

In this case, the time frequency resources used by UEs are not orthogonal. In other words, different UEs simultaneously use the same resources for transmission. In order to enable the base station to distinguish different UEs, non-orthogonal multiple access (NOMA) technology can be applied. In the NOMA, each of UE uses a different Multiple Access (MA) signature (hereinafter, an MA signature is also simply referred to as a signature) to identify itself. FIG. 2 is a schematic diagram showing a group of UE acquiring MA signatures from an MA signature pool and sharing multiple access time frequency resources for transmission. The MA signature may be acquired in various manners in the NOMA technology without any restriction.

Various kinds of communication system numerology are supported by an NR system due to different requirements of different transmission services. However, in the case of adopting different communication system numerology, a format of a multiple access signature varies, and is not synchronized in time domain and in frequency domain, resulting in that the NOMA cannot be performed.

Therefore, in this embodiment, the MA signature pool is divided into multiple sub signature pools based on the communication system numerology. The determination unit 101 selects a signature for the UE among a sub signature pool corresponding to communication system numerology for the user equipment.

For example, the communication system numerology includes one or more of the following: sub-carrier spacing, a length of an orthogonal frequency division multiplexing (OFDM) symbol, a length of a cyclic prefix, a length of a modulation sequence, and a length of an interleaver.

Figures 3, 4:
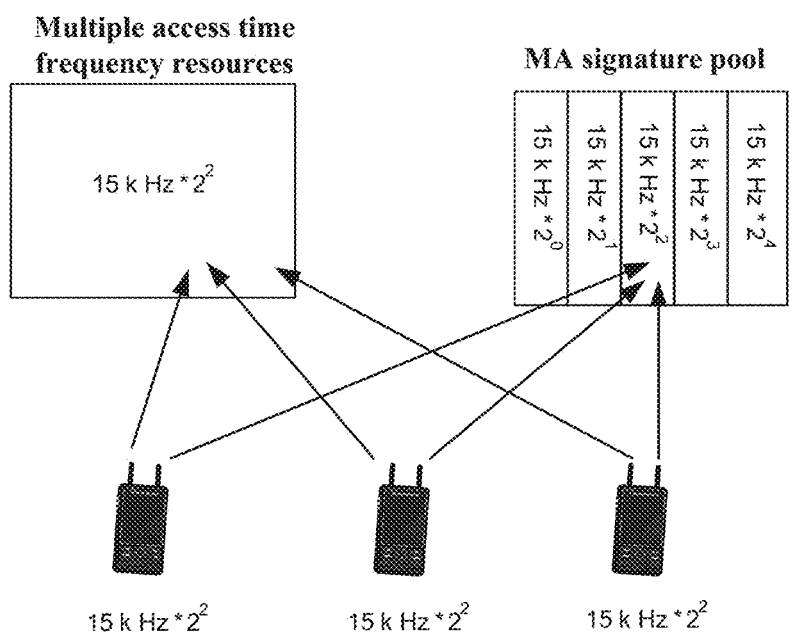
FIG. 3 shows configuration of transmission communication numerology supported by an NR system.
FIG. 4 is a schematic diagram showing a group of UE acquiring MA signatures and sharing multiple access time frequency resources for transmission, in a case that a multiple access signature pool is divided into sub signature pools.

Taking the sub-carrier spacing as an example, different sub-carrier spacing transmissions are supported by the NR system. FIG. 3 shows configuration of transmission communication numerology supported by an NR system. The sub-carrier spacing supported by the NR system is $\Delta f=2^\mu \cdot 15$ [kHz], where $\mu$ may be set to be 0, 1, . . . , 4, and $\mu$ and a cyclic prefix in FIG. 3 may be given by high layer parameters UL-BWP-mu and UL-BWP-cp.

Accordingly, the number of the divided sub signature pools is equal to the number of categories of sub-carrier spacing supported by communication systems. For the example shown in FIG. 3, an MA signature pool is divided into 5 sub signature pools.

FIG. 4 is a schematic diagram showing a group of UE acquiring MA signatures and sharing multiple access time frequency resources for transmission in a case that the MA signature pool is divided into sub signature pools the number of which equals to the number of categories of sub-carrier spacing. In FIG. 4, the MA signature pool is divided into 5 sub signature pools respectively respective categories of sub-carrier spacing. Further, sub-carrier spacing used in the example shown in FIG. 4 is $2^2 \cdot 15$ [kHz], that is, $\mu$ is equal to 2. Therefore, the UE determines the MA signature from a sub signature pool corresponding to the sub-carrier spacing $2^2 \cdot 15$ [kHz].

Figure 5A:
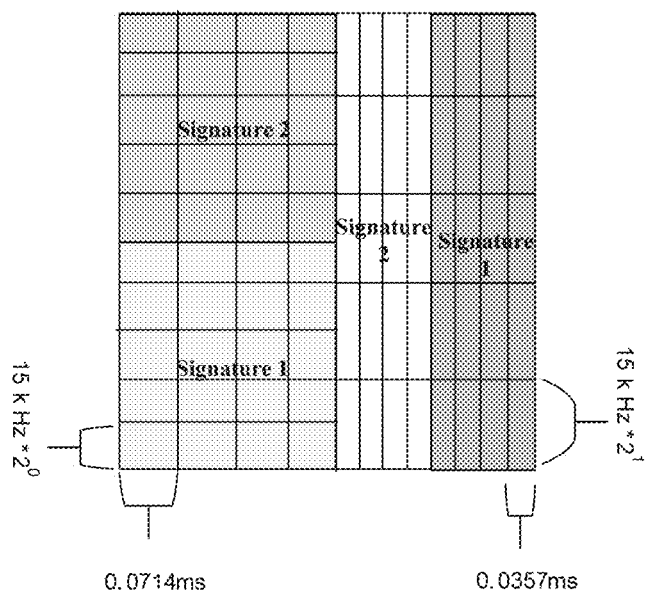
FIG. 5a is a schematic diagram showing formats of multiple access signatures.

For ease of understanding, it is assumed that each MA signature occupies 4 symbols in the time domain and 5 sub-carriers in the frequency domain. FIG. 5a is a schematic diagram showing formats of MA signatures in a case that the sub-carrier spacing is $2^0 \cdot 15$ [kHz] and $2^1 \cdot 15$ [kHz], respectively. It can be seen that the formats of the MA signatures are different in the case of the two categories of sub-carrier spacing, and are not synchronized in time domain and in frequency domain. In order to perform NOMA, it is required to select a signature corresponding to the sub-carrier spacing.

Figure 5B:
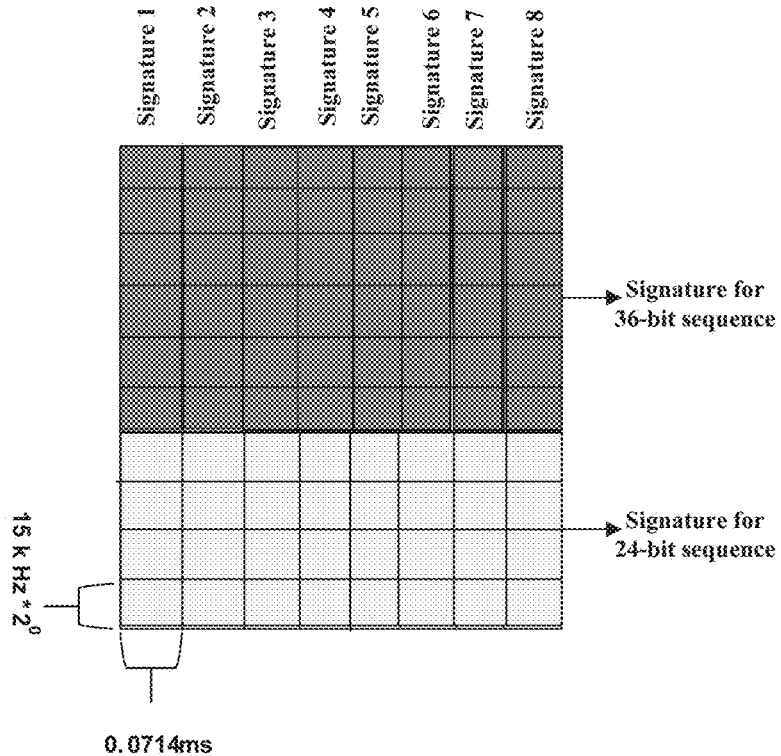
FIG. 5b is a schematic diagram showing dividing of sub signature pools of multiple access signatures.

It should be understood that although the above description is given with the sub-carrier spacing as an example of the communication system numerology, the present disclosure is not limited thereto. Instead, it may be applied to any other communication system numerology having different values which may affect the format of the MA signature. For example, in a case that sequence lengths of data to be transmitted by user equipment are different, different amounts of time frequency resources would be occupied when the same modulation format is used, and thus the NOMA cannot be performed among user equipment with different sequence lengths of transmitted data. FIG. 5b shows the MA sub signature pools in a case of 64QAM modulation manner, with sequence lengths of transmitted data having values of 36 bits (shown in a shaded part) and 24 bits (shown in a blank part) respectively. Each sub signature pool includes eight signatures. It can be seen that although the two categories of signatures each occupies a time length of one RE, the two categories of signatures correspond to different widths of frequency domain. It should be noted that, in a case that sequence lengths of the transmitted data are different, even though two user equipment use frequency resources with identical size, for example, by using different modulation formats, the NOMA cannot be performed. In this case, the division of the sub signature pools is also required to be performed based on the sequence length of data transmitted by the user equipment.

In an example, the determination unit 101 may randomly determine the signature to be used for the user equipment among the sub signature pool. In this case, the transmission unit 102 may notify the base station of information of the determined signature to be used for the user equipment via a physical uplink control channel (PUCCH). In this way, when receiving data multiplexed on the same resources from a plurality of user equipment, the base station can demodulate data corresponding to the user equipment using the signature.

In another example, the determination unit 101 may determine, among the sub signature pool, the signature to be used for the user equipment based on an identifier of the user equipment. In this case, there is a determined relationship between the identifier of the user equipment and the signature, and this relationship is known by both the user equipment and the base station. For example, a relationship between a signature signature_idx and an identifier UE_id of the user equipment is expressed as signature_idx=(UE_id) mod (#of signature), where #of signature represents the total number of signatures, and mod represents modulus operation. It should be understood that the above expression is only schematic. The relationship between the signature signature_idx and the identifier UE_id may be expressed in other forms, as long as the user and the base station agree on the relationship. In this example, the transmission unit 102 is not required to notify the base station of the signature used for the user equipment. The base station can infer the signature used for the user equipment based on the identifier of the user equipment.

In yet another example, the signature to be used for the user equipment is determined by the base station. For example, in a random manner, the determination unit 101 determines the signature based on one of the following signaling from the base station: RRC signaling, media access control (MAC) signaling, and L1 signaling. That is, the signature to be used for the user equipment is explicitly specified by the base station.

A signature conflict may occur in each of the above examples. That is, one signature is selected for more than one UE. In a case of conflict, the base station cannot distinguish data transmitted by multiple UEs, resulting in communication failure. Specifically, in a case that one signature is selected for multiple UEs, a "signature conflict" occurs, resulting in NOMA failure. The base station notifies the UEs of the NOMA failure. When finding the NOMA failure, UE can determine that a signature selected for itself conflicts with a signature selected for another UE. In order to resolve the conflict, some specific mechanisms are required.

For example, the transmission unit 102 may be configured to perform random back-off to resolve a conflict, in a case that the signature determined for the user equipment is the same as the signature determined for another user equipment so that the conflict occurs. Specifically, the conflicting user equipment randomly selects a back-off number, and performs back-off based on the back-off number. A user equipment that first returns to zero is to acquire a right to use the signature, and the other user equipment selects another signature.

Alternatively, the transmission unit 102 may be configured to acquire information of dedicated time frequency resources allocated by the base station for the user equipment from the base station, in a case that the signature determined for the user equipment is the same as the signature determined for another user equipment so that the conflict occurs. The dedicated time frequency resources allocated by the base station for the user equipment are different from the multiple access time frequency resources. That is, the user equipment is switched from a grant-free transmission mechanism to a grant-based transmission mechanism, so as to ensure no resource conflict between the user equipment and other user equipment. For example, in a case that the conflicting user equipment has a high priority level, such a manner can be adopted.

With the electronic apparatus 100 according to this embodiment, the multiple access signature pool is divided into multiple sub signature pools based on the communication system numerology, so that user equipment sharing one resource pool through multiple access can select appropriate signatures, such that the NOMA can be performed even in a case of different communication system numerology.

Second Embodiment

Figure 6:
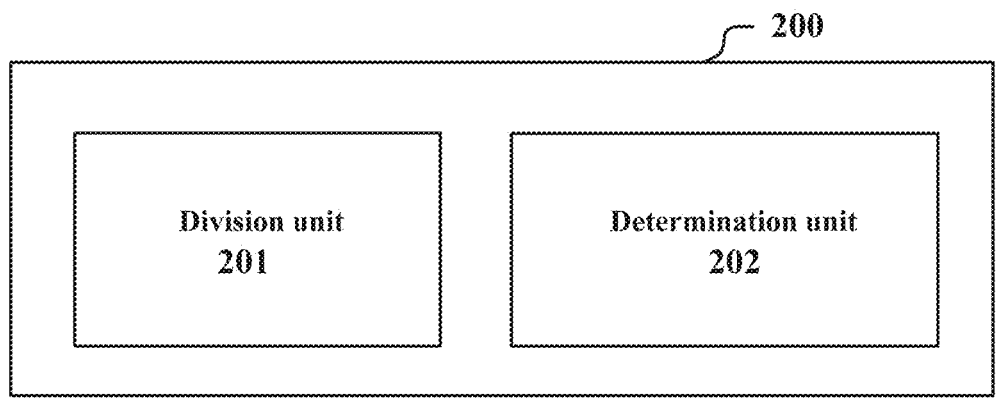
FIG. 6 is a block diagram showing function modules of an electronic apparatus for wireless communications according to another embodiment of the present disclosure.

FIG. 6 is a block diagram showing function modules of an electronic apparatus 200 for wireless communications according to another embodiment of the present disclosure. As shown in FIG. 6, the electronic apparatus 200 includes a division unit 201 and a determination unit 202. The division unit 201 is configured to divide a multiple access signature pool into multiple sub signature pools based on communication system numerology. The determination unit 202 is configured to determine a signature to be used for user equipment among a sub signature pool corresponding to communication system numerology for the user equipment. The user equipment transmits, based on the determined signature, using multiple access time frequency resources. The multiple access time frequency resources are shared by a group of user equipment including the user equipment.

The division unit 201 and the determination unit 202 may be implemented by one or more processing circuitry. The processing circuitry may be implemented as, for example, a chip. Further, it should be understood that the above function units in the apparatus shown in FIG. 6 are only logical modules divided based on the specific functions implemented by the function units, and are not intended to limit the specific embodiments.

The electronic apparatus 200 may be arranged at a base station side or may be communicatively connected to the base station. Here, it should further be noted that the electronic apparatus 200 may be implemented at a chip level, or may be implemented at an apparatus level. For example, the electronic apparatus 200 may operate as the base station itself, and may further include an external apparatus such as a memory and a transceiver (not shown in the drawings). The memory may be configured to store programs required to be executed by the base station and related data information for implementing various functions. The transceiver may include one or more communication interfaces to support communication with different apparatus (such as user equipment, another base station or the like). An implementation form of the transceiver is not specifically limited herein.

For example, the communication system numerology may include one or more of the following: sub-carrier spacing, a length of an orthogonal frequency division multiplexing symbol, a length of a cyclic prefix, a length of a modulation sequence, and a length of an interleaver. Taking the sub-carrier spacing as an example, the number of the divided sub signature pools is equal to the number of categories of sub-carrier spacing supported by the communication system. The communication system numerology and the divided sub signature pools are described in detail in the first embodiment, and are not repeated here.

The determination unit 202 may provide a group of user equipment with information of multiple access time frequency resources shared by the group of user equipment via a GC-PDCCH. Alternatively, the determination unit 202 may provide a group of user equipment with information of multiple access time frequency resources shared by the group of user equipment via RRC signaling.

The group of user equipment shares the multiple access time frequency resources by using different MA signatures. As described in the first embodiment, for example, there may be three ways to determine the MA signature. Accordingly, the determination unit 202 for the base station side may determine the MA signature for the user equipment as follows.

In an example, the determination unit 202 determines a signature to be used for the user equipment by acquiring information of a signature randomly determined by the user equipment from the user equipment via the PUCCH. For ease of understanding, FIG. 7 is a schematic diagram showing an information procedure between user equipment and a base station in this example.

Figure 7:
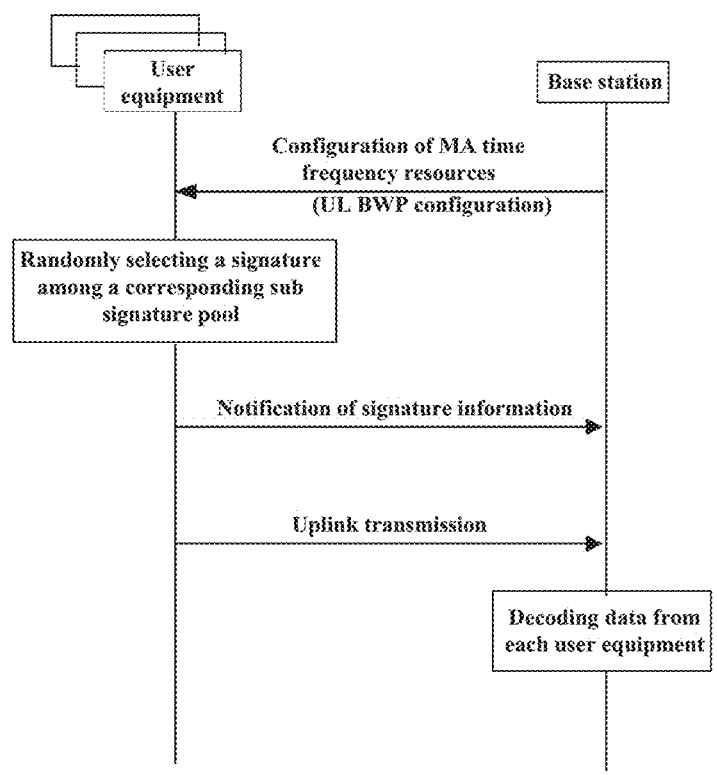
FIG. 7 is a schematic diagram showing an information procedure between user equipment and a base station.

As shown in FIG. 7, the base station first transmits configuration of MA time frequency resources to a group of user equipment. For example, the base station indicates to the group of user equipment the time frequency resources to be shared by the group of user equipment via the GC-PDCCH or RRC. In addition, the base station may transmit uplink BWP configuration to the group of user equipment, such as the above described UL-BWP-mu and UL-BWP-cp. Next, the user equipment randomly selects an MA signature from among a sub signature pool corresponding to its communication system numerology, and notifies the base station of information of the selected MA signature. Subsequently, the user equipment uses the MA signature to perform uplink transmission on the MA time frequency resources. On receipt of data from the group of user equipment, the base station decodes data from each of the user equipment using an MA signature for the user equipment.

Figure 8:
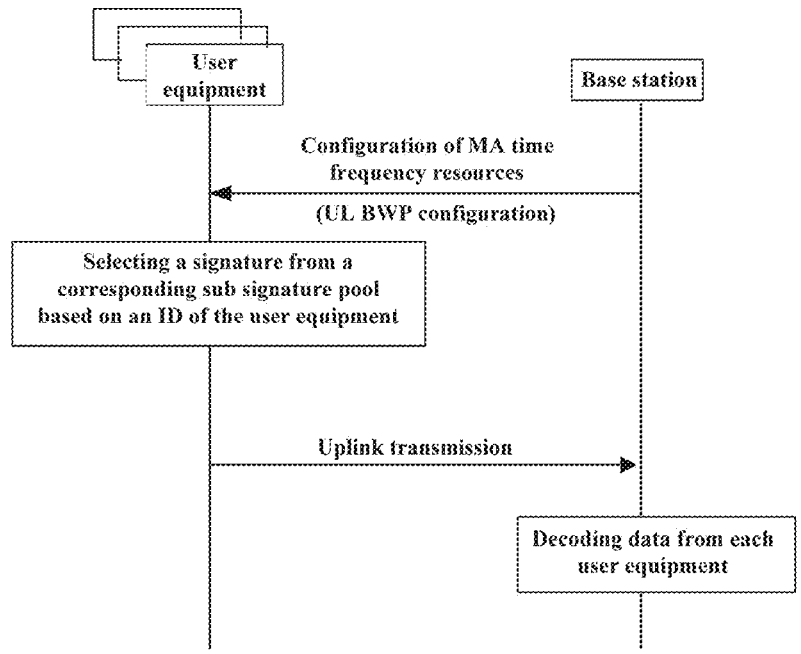
FIG. 8 is a schematic diagram showing another information procedure between user equipment and a base station.

In another example, the determination unit 202 is configured to determine the signature to be used for the user equipment among the sub signature pool based on an identifier of the user equipment. FIG. 8 is a schematic diagram showing an information procedure between user equipment and a base station in this example.

As shown in FIG. 8, similar to the procedure shown in FIG. 7, the base station first transmits configuration of MA time frequency resources to a group of user equipment, and may further transmit the uplink BWP configuration to the group of user equipment. Next, the user equipment selects a signature from among a sub signature pool corresponding to its communication system numerology based on an identifier (ID) of the user equipment. Since a relationship between the ID and the signature is known to both the user equipment and the base station, the user equipment is not required to transmit information of the signature to the base station, and the base station infers the signature by itself. Subsequently, the user equipment uses the signature to perform uplink transmission on MA time frequency resources. On receipt of data from the group of user equipment, the base station decodes data from each of the user equipment using a signature corresponding to the ID of the user equipment.

Figure 9:
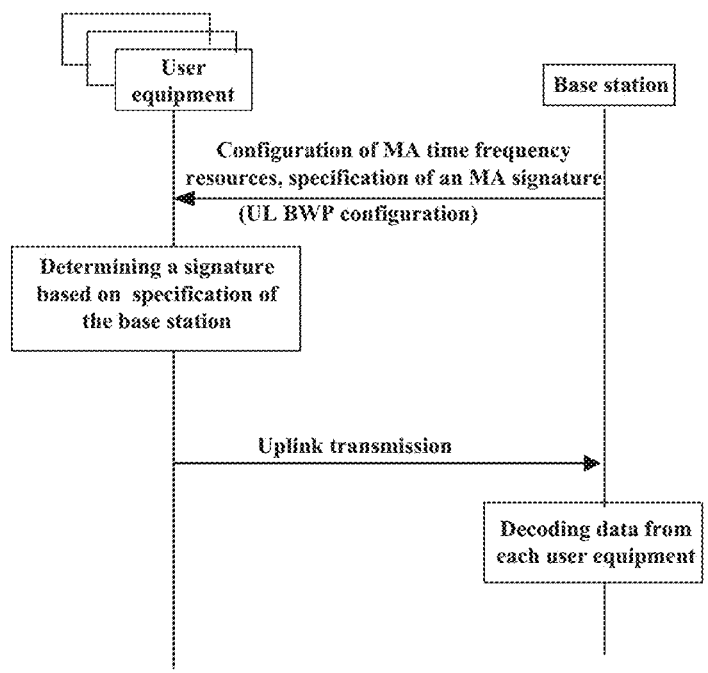
FIG. 9 is a schematic diagram showing another information procedure between user equipment and a base station.

In still another example, the determination unit 202 randomly determines a signature to be used for the user equipment among a sub signature pool corresponding to the communication system numerology for the user equipment. The user equipment may be notified of information of the determined signature via one of the following signaling: RRC signaling, MAC signaling, and L1 signaling. FIG. 9 is a schematic diagram showing an information procedure between user equipment and a base station in this example.

As shown in FIG. 9, similar to the procedure shown in FIG. 7, the base station first transmits configuration of MA time frequency resources to a group of user equipment, and may further transmit the uplink BWP configuration to the group of user equipment. In addition, the base station further notifies the user equipment of an MA signature randomly determined for the user equipment. Next, the user equipment determines, based on specification from the base station, a signature to be used, and uses the signature to perform uplink transmission on MA time frequency resources. On receipt of the data from the group of user equipment, the base station decodes data from each of the user equipment using the signature for the user equipment.

In addition, when transmitting data to the user equipment, the base station further encodes the data to be transmitted to the user equipment using the above signature.

In a case that a signature used for one user equipment is the same as a signature used for another user equipment in the group so that a conflict occurs, the determination unit 202 is further configured to allocate dedicated time frequency resources different from the multiple access time frequency resources for the user equipment. For example, in a case that the user equipment has a high priority level, the determination unit 202 allocates the dedicated time frequency resources for the user equipment to avoid competition with other user equipment, so as to ensure communication quality of the user equipment.

With the electronic apparatus 200 according to this embodiment, the multiple access signature pool is divided into multiple sub signature pools based on the communication system numerology, so that user equipment sharing one resource pool through multiple access can select appropriate signatures, such that the NOMA can be performed even in a case of different communication system numerology.

Third Embodiment

In the process of describing the electronic apparatus for wireless communications in the embodiments described above, obviously, some processing and methods are also disclosed. Hereinafter, an overview of the methods is given without repeating some details disclosed above. However, it should be noted that, although the methods are disclosed in a process of describing the electronic apparatus for wireless communications, the methods do not certainly employ or are not certainly executed by the aforementioned components. For example, the embodiments of the electronic apparatus for wireless communications may be partially or completely implemented with hardware and/or firmware, the methods for wireless communications described below may be executed by a computer-executable program completely, although the hardware and/or firmware of the electronic apparatus for wireless communications can also be used in the methods.

Figure 10:
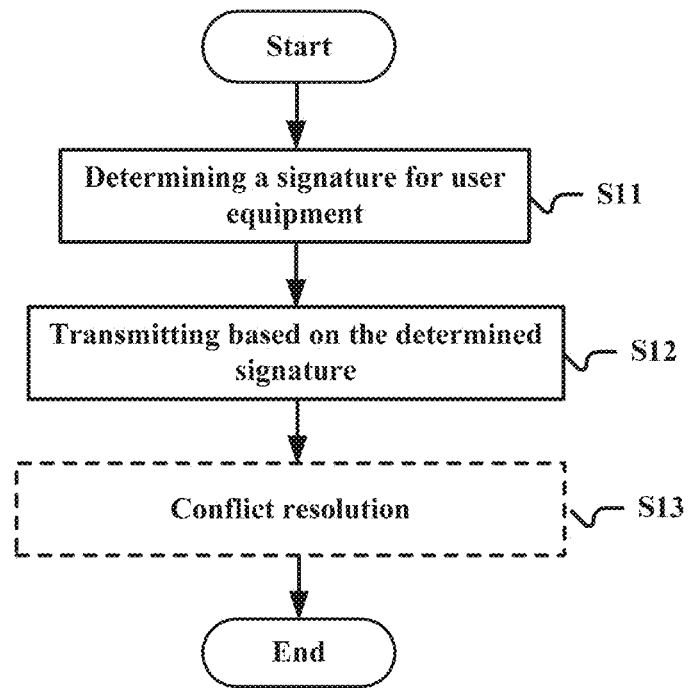
FIG. 10 is a flowchart of a method for wireless communications according to an embodiment of the present disclosure.

FIG. 10 is a flowchart of a method for wireless communications according to an embodiment of the present disclosure. As shown in FIG. 10, the method includes: determining a signature to be used for user equipment among a multiple access signature pool (S11), where the multiple access signature pool is divided into multiple sub signature pools based on communication system numerology, and the determined signature belongs to a sub signature pool corresponding to communication system numerology for the user equipment; and transmitting, based on the determined signature, using multiple access time frequency resources (S12). The multiple access time frequency resources are shared by a group of user equipment including the user equipment. This method, for example, may be performed at the user equipment side.

The communication system numerology may include one or more of the following: sub-carrier spacing, a length of an orthogonal frequency division multiplexing symbol, a length of a cyclic prefix, a length of a modulation sequence, and a length of an interleaver. For example, the number of the divided sub signature pools is equal to the number of categories of sub-carrier spacing supported by communication systems.

In step S11, the signature to be used for the user equipment may be randomly determined among the sub signature pool. In this case, the above method may further include the following step (not shown in the drawings): notifying the base station of information of the determined signature to be used for the user equipment via a PUCCH.

In step S11, the signature to be used for the user equipment may also be determined among the sub signature pool based on an identifier of the user equipment.

In addition, the signature may be determined by the base station. In step S11, the signature may also be determined based on one of the following signaling from the base station: radio resource control signaling, media access control signaling, and L1 signaling.

As indicated by a dashed line block in FIG. 10, the above method may further include a step S13: resolving a conflict in a case that a signature determined by one user equipment is the same as a signature determined by another user equipment so that the conflict occurs. For example, in step S13, random back-off may be performed to resolve the conflict. Alternatively, information of dedicated time frequency resources allocated by the base station for the user equipment that are different from the multiple access time frequency resources may be acquired from the base station.

In addition, before step S11, information of the multiple access time frequency resources shared by the group of user equipment may be acquired via a GC-PDCCH or RRC.

Figure 11:
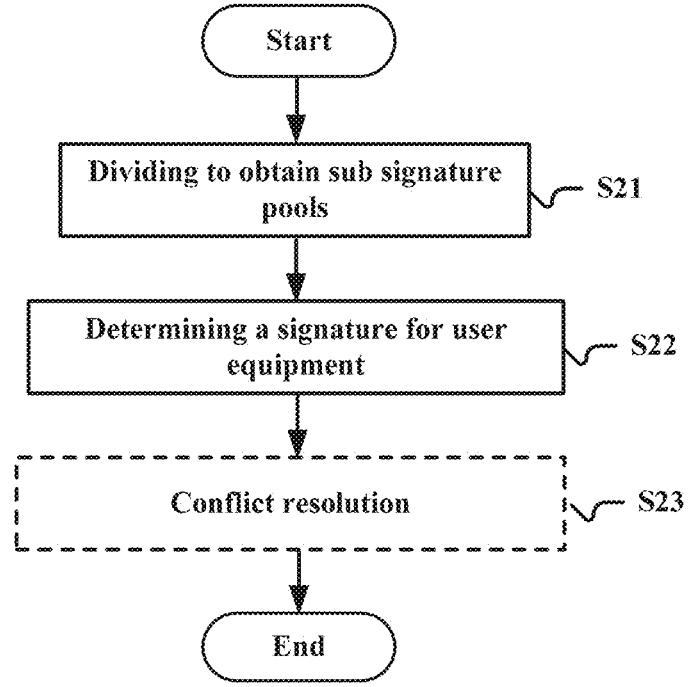
FIG. 11 is a flowchart of a method for wireless communications according to another embodiment of the present disclosure.

FIG. 11 is a flowchart of a method for wireless communications according to another embodiment of the present disclosure. As shown in FIG. 11, the method includes: dividing, based on communication system numerology, a multiple access signature pool into multiple sub signature pools (S21); and determining, among a sub signature pool corresponding to communication system numerology for user equipment, a signature to be used for the user equipment (S22). The user equipment transmits, based on the determined signature, using multiple access time frequency resources, which are shared by a group of user equipment including the user equipment. This method, for example, may be performed at a base station side.

As indicated by a dashed line block in FIG. 11, the above method may further include a step S23: resolving a conflict in a case that a signature determined by one user equipment is the same as a signature determined by another user equipment so that the conflict occurs. For example, in step S23, dedicated time frequency resources different from the multiple access time frequency resources may be allocated for the user equipment.

Relevant technical details of this method are similar to or correspond to those of the method shown in FIG. 10 and are not repeated herein.

It should be noted that above methods may be utilized in combination or separately. Details of the above methods are described in the first to second embodiments, and are not repeated here.

The technology according to the present disclosure is applicable to various products.

For example, the electronic apparatus 200 may be implemented as various base stations. The base station may be implemented as any type of evolution Node B (eNB) or gNB (a 5G base station). The eNB includes, for example, a macro eNB and a small eNB. The small eNB may be an eNB covering a cell smaller than a macro cell, such as a pico eNB, a micro eNB, and a home (femto) eNB. The case for the gNB is similar to the above. Alternatively, the base station may be implemented as any other type of base station, such as a NodeB and a base transceiver station (BTS). The base station may include a main body (that is also referred to as a base station apparatus) configured to control radio communication, and one or more remote radio heads (RRHs) disposed in a different place from the main body. In addition, various types of user equipments may each operate as the base station by temporarily or semi-persistently executing a base station function.

The electronic apparatus 100 may be implemented as various user equipments. The user equipment may be implemented as a mobile terminal (such as a smartphone, a tablet personal computer (PC), a notebook PC, a portable game terminal, a portable/dongle-type mobile router, and a digital camera device) or an in-vehicle terminal such as a car navigation apparatus. The user equipment may also be implemented as a terminal (also referred to as a machine type communication (MTC) terminal) that performs machine-to-machine (M2M) communication. In addition, the user equipment may be a wireless communication module (such as an integrated circuit module including a single chip) mounted on each of the terminals described above.

Application Example Regarding a Base Station

First Application Example

Figure 12:
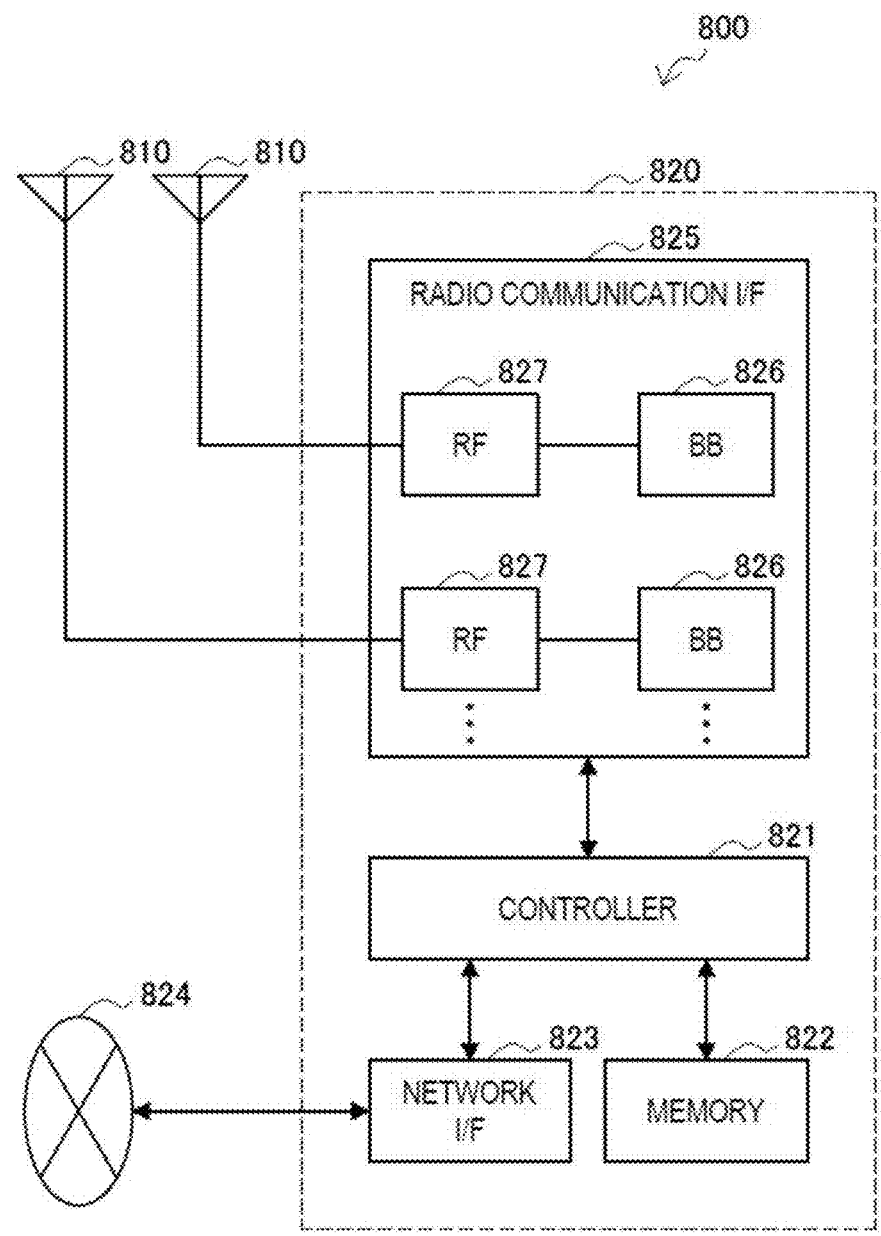
FIG. 12 is a block diagram showing a first example of an exemplary configuration of an eNB or gNB to which technology according to the present disclosure may be applied.

FIG. 12 is a block diagram showing a first example of an exemplary configuration of an eNB or gNB to which technology according to the present disclosure may be applied. It should be noted that the following description is given by taking the eNB as an example, which is also applicable to the gNB. An eNB 800 includes one or more antennas 810 and a base station apparatus 820. The base station apparatus 820 and each of the antennas 810 may be connected to each other via a radio frequency (RF) cable.

Each of the antennas 810 includes a single or multiple antennal elements (such as multiple antenna elements included in a multiple-input multiple-output (MIMO) antenna), and is used for the base station apparatus 820 to transmit and receive wireless signals. As shown in FIG. 12, the eNB 800 may include the multiple antennas 810. For example, the multiple antennas 810 may be compatible with multiple frequency bands used by the eNB 800. Although FIG. 12 shows the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control and scheduling. The control may be performed in corporation with an eNB or a core network node in the vicinity. The memory 822 includes a RAM and a ROM, and stores a program executed by the controller 821 and various types of control data (such as terminal list, transmission power data and scheduling data).

The network interface 823 is a communication interface for connecting the base station apparatus 820 to a core network 824. The controller 821 may communicate with a core network node or another eNB via the network interface 823. In this case, the eNB 800, and the core network node or another eNB may be connected to each other via a logic interface (such as an Si interface and an X2 interface). The network interface 823 may also be a wired communication interface or a wireless communication interface for wireless backhaul. If the network interface 823 is a wireless communication interface, the network interface 823 may use a higher frequency band for wireless communication than that used by the radio communication interface 825.

The radio communication interface 825 supports any cellular communication scheme (such as Long Term Evolution (LTE) and LTE-advanced), and provides wireless connection to a terminal located in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, Media Access Control (MAC), Radio Link Control (RLC), and a Packet Data Convergence Protocol (PDCP)). The BB processor 826 may have a part or all of the above-described logical functions instead of the controller 821. The BB processor 826 may be a memory storing communication control programs, or a module including a processor and a related circuit configured to execute the programs. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives wireless signals via the antenna 810.

As shown in FIG. 12, the radio communication interface 825 may include the multiple BB processors 826. For example, the multiple BB processors 826 may be compatible with multiple frequency bands used by the eNB 800. The radio communication interface 825 may include multiple RF circuits 827, as shown in FIG. 12. For example, the multiple RF circuits 827 may be compatible with multiple antenna elements. Although FIG. 12 shows the example in which the radio communication interface 825 includes the multiple BB processors 826 and the multiple RF circuits 827, the radio communication interface 825 may also include a single BB processor 826 and a single RF circuit 827.

In the eNB 800 shown in FIG. 12, a transceiver of the electronic apparatus 200 may be implemented by the radio communication interface 825. At least a part of functions may be implemented by the controller 821. For example, the controller 821 may determine the MA signature for the user equipment and implement shared transmission of a group of user equipment by performing functions of the division unit 201 and the determination unit 202.

Second Application Example

Figure 13:
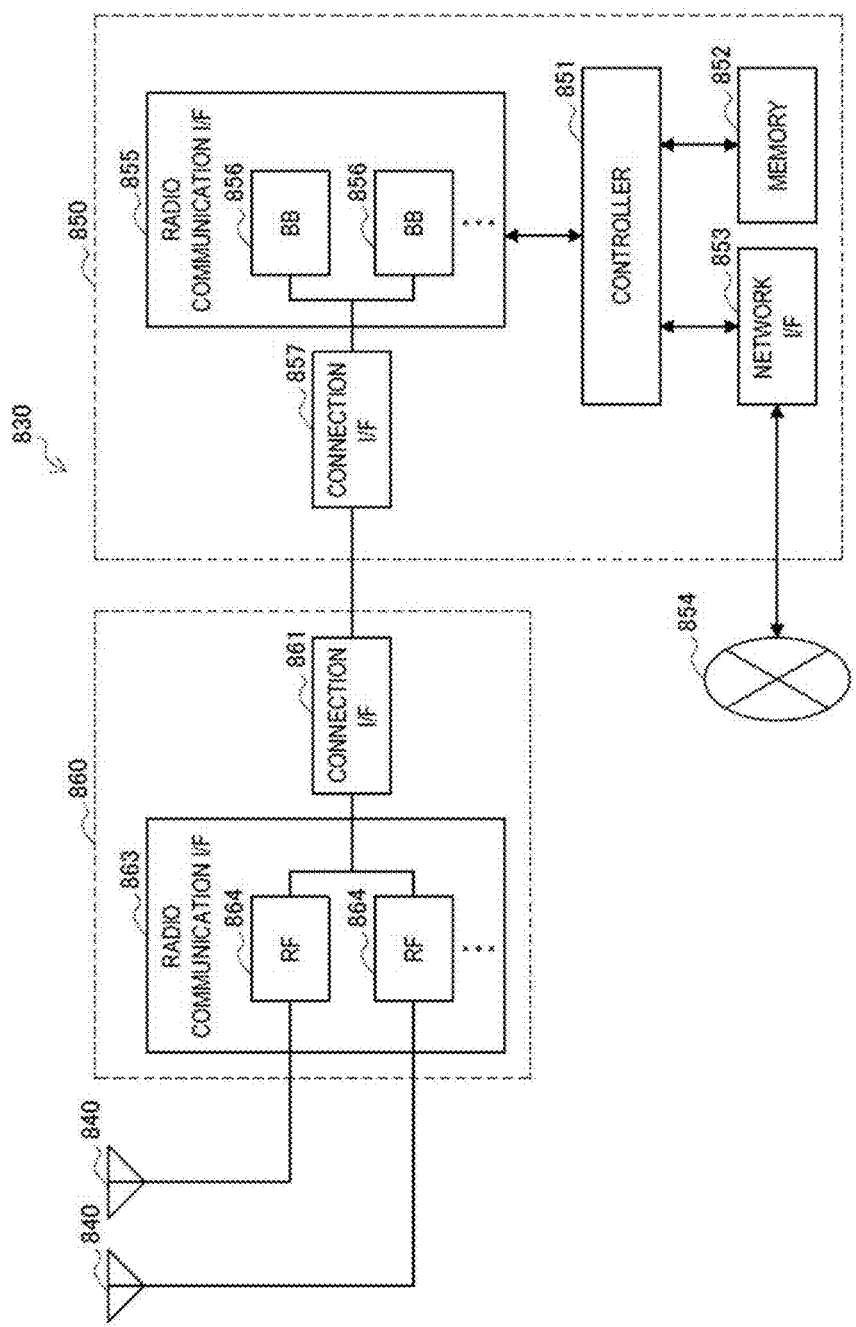
FIG. 13 is a block diagram showing a second example of the exemplary configuration of the eNB or gNB to which the technology according to the present disclosure may be applied.

FIG. 13 is a block diagram showing a second example of the exemplary configuration of an eNB or gNB to which the technology according to the present disclosure may be applied. It should be noted that the following description is given by taking the eNB as an example, which is also applied to the gNB. An eNB 830 includes one or more antennas 840, a base station apparatus 850, and an RRH 860. The RRH 860 and each of the antennas 840 may be connected to each other via an RF cable. The base station apparatus 850 and the RRH 860 may be connected to each other via a high speed line such as an optical fiber cable.

Each of the antennas 840 includes a single or multiple antennal elements (such as multiple antenna elements included in an MIMO antenna), and is used for the RRH 860 to transmit and receive wireless signals. As shown in FIG. 13, the eNB 830 may include the multiple antennas 840. For example, the multiple antennas 840 may be compatible with multiple frequency bands used by the eNB 830. Although FIG. 13 shows the example in which the eNB 830 includes the multiple antennas 840, the eNB 830 may also include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 12.

The radio communication interface 855 supports any cellular communication scheme (such as LTE and LTE-advanced), and provides wireless communication to a terminal located in a sector corresponding to the RRH 860 via the RRH 860 and the antenna 840. The radio communication interface 855 may typically include, for example, a BB processor 856. The BB processor 856 is the same as the BB processor 826 described with reference to FIG. 12, except that the BB processor 856 is connected to an RF circuit 864 of the RRH 860 via the connection interface 857. As show in FIG. 13, the radio communication interface 855 may include the multiple BB processors 856. For example, the multiple BB processors 856 may be compatible with multiple frequency bands used by the eNB 830. Although FIG. 13 shows the example in which the radio communication interface 855 includes the multiple BB processors 856, the radio communication interface 855 may also include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives wireless signals via the antenna 840. The radio communication interface 863 may typically include, for example, the RF circuit 864. The RF circuit 864 may include, for example, a mixer, a filter and an amplifier, and transmits and receives wireless signals via the antenna 840. The radio communication interface 863 may include multiple RF circuits 864, as shown in FIG. 13. For example, the multiple RF circuits 864 may support multiple antenna elements. Although FIG. 13 shows the example in which the radio communication interface 863 includes the multiple RF circuits 864, the radio communication interface 863 may also include a single RF circuit 864.

In the eNB 830 shown in FIG. 13, a transceiver of the electronic apparatus 200 may be implemented by the radio communication interface 825. At least a part of functions may also be implemented by the controller 821. For example, the controller 821 may determine the MA signature for the user equipment and implement the shared transmission of a group of user equipment by performing functions of the division unit 201 and the determination unit 202.

Application Example Regarding User Equipment

First Application Example

Figure 14:
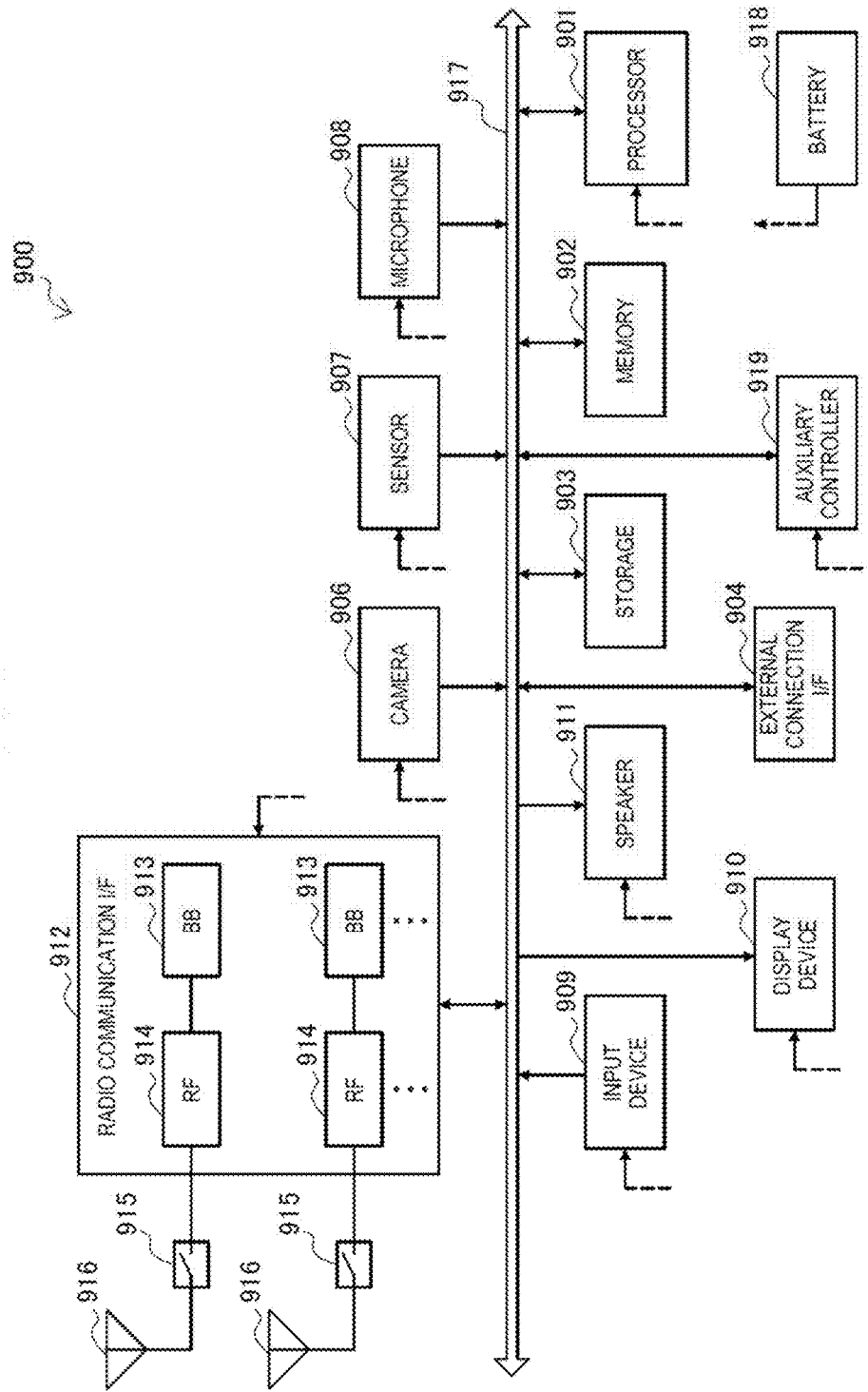
FIG. 14 is a block diagram showing an example of a schematic configuration of a smartphone to which the technology according to the present disclosure may be applied.

FIG. 14 is a block diagram showing an exemplary configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes a RAM and a ROM, and stores a program executed by the processor 901 and data. The storage 903 may include a storage medium such as a semiconductor memory and a hard disk. The external connection interface 904 is an interface for connecting an external device (such as a memory card and a universal serial bus (USB) device) to the smartphone 900.

The camera 906 includes an image sensor (such as a charge coupled device (CCD) and a complementary metal oxide semiconductor (CMOS)), and generates a captured image. The sensor 907 may include a group of sensors, such as a measurement sensor, a gyro sensor, a geomagnetism sensor, and an acceleration sensor. The microphone 908 converts sounds that are inputted to the smartphone 900 to audio signals. The input device 909 includes, for example, a touch sensor configured to detect touch onto a screen of the display device 910, a keypad, a keyboard, a button, or a switch, and receives an operation or information inputted from a user. The display device 910 includes a screen (such as a liquid crystal display (LCD) and an organic light-emitting diode (OLED) display), and displays an output image of the smartphone 900. The speaker 911 converts audio signals that are outputted from the smartphone 900 to sounds.

The radio communication interface 912 supports any cellular communication scheme (such as LTE and LTE-advanced), and performs a wireless communication. The radio communication interface 912 may include, for example, a BB processor 913 and an RF circuit 914. The BB processor 913 may perform, for example, encoding/decoding, modulating/demodulating, and multiplexing/de-multiplexing, and perform various types of signal processing for wireless communication. The RF circuit 914 may include, for example, a mixer, a filter and an amplifier, and transmits and receives wireless signals via the antenna 916. It should be noted that although FIG. 14 shows a case that one RF link is connected to one antenna, which is only illustrative, and a case that one RF link is connected to multiple antennas through multiple phase shifters may also exist. The radio communication interface 912 may be a chip module having the BB processor 913 and the RF circuit 914 integrated thereon. The radio communication interface 912 may include multiple BB processors 913 and multiple RF circuits 914, as shown in FIG. 14. Although FIG. 14 shows the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of wireless communication scheme such as a short-distance wireless communication scheme, a near field communication scheme, and a radio local area network (LAN) scheme. In this case, the radio communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the radio communication interface 912.

Each of the antennas 916 includes a single or multiple antenna elements (such as multiple antenna elements included in an MIMO antenna) and is used for the radio communication interface 912 to transmit and receive wireless signals. The smartphone 900 may include the multiple antennas 916, as shown in FIG. 14. Although FIG. 14 shows the example in which the smartphone 900 includes the multiple antennas 916, the smartphone 900 may also include a single antenna 916.

Furthermore, the smartphone 900 may include the antenna 916 for each wireless communication scheme. In this case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smart phone 900 shown in FIG. 14 via feeder lines that are partially shown as dashed lines in FIG. 14. The auxiliary controller 919, operates a minimum necessary function of the smart phone 900, for example, in a sleep mode.

In the smartphone 900 shown in FIG. 14, a transceiver of the electronic apparatus 100 may be implemented by the radio communication interface 912. At least a part of functions may be implemented by the processor 901 or the auxiliary controller 919. For example, the processor 901 or the auxiliary controller 919 may select an appropriate MA signature based on the communication system numerology for the user equipment and implement shared transmission of a group of user equipment by performing functions of the determination unit 101 and the transmission unit 102.

Second Application Example

Figure 15:
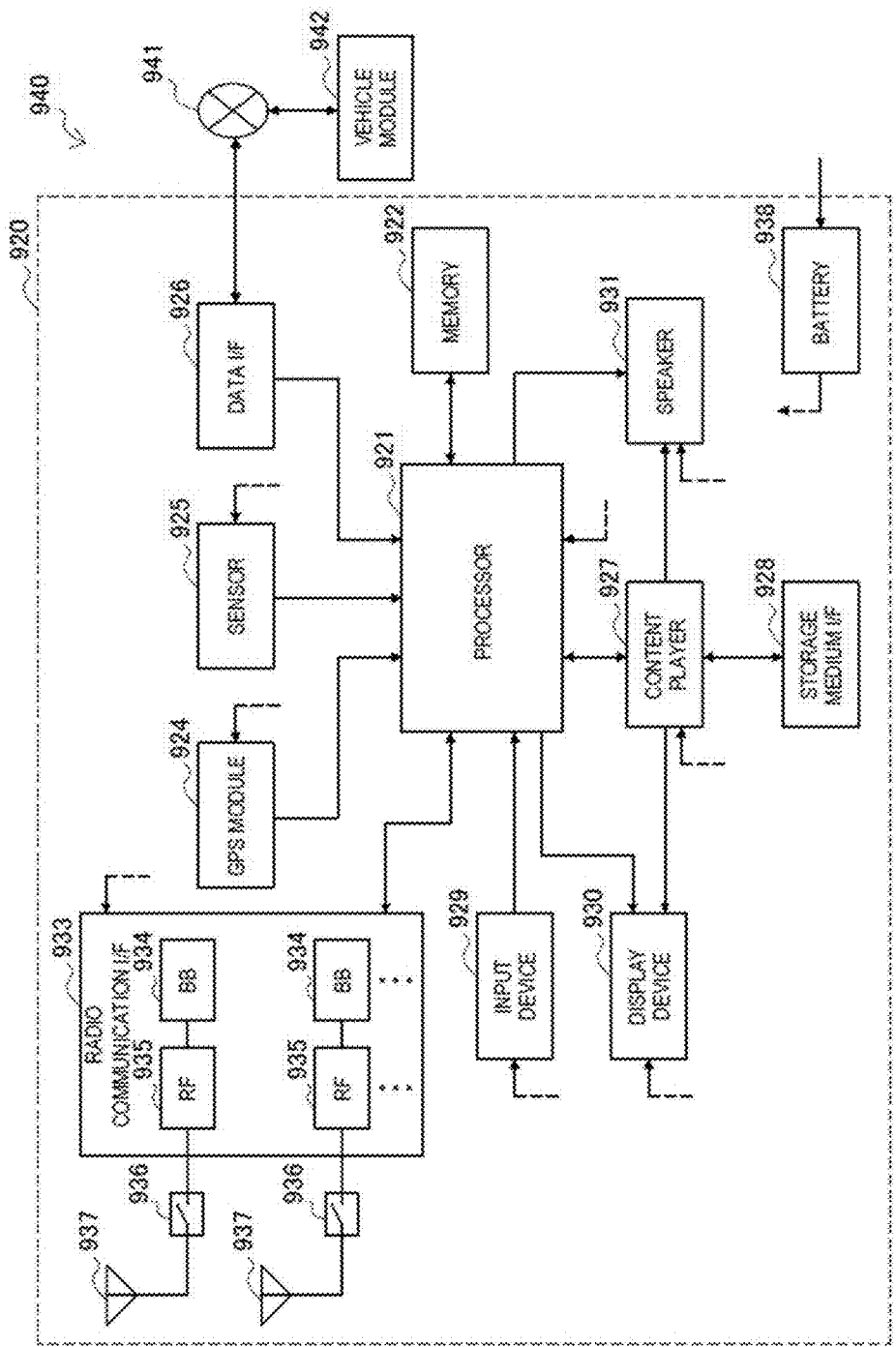
FIG. 15 is a block diagram showing an example of a schematic configuration of a car navigation apparatus to which the technology of the present disclosure may be applied.

FIG. 15 is a block diagram showing an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example a CPU or a SoC, and controls a navigation function and additional function of the car navigation apparatus 920. The memory 922 includes RAM and ROM, and stores a program that is executed by the processor 921, and data.

The GPS module 924 determines a position (such as latitude, longitude and altitude) of the car navigation apparatus 920 by using GPS signals received from a GPS satellite. The sensor 925 may include a group of sensors such as a gyro sensor, a geomagnetic sensor and an air pressure sensor. The data interface 926 is connected to, for example, an in-vehicle network 941 via a terminal that is not shown, and acquires data (such as vehicle speed data) generated by the vehicle.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or information inputted from a user. The display device 930 includes a screen such as an LCD or OLED display, and displays an image of the navigation function or content that is reproduced. The speaker 931 outputs a sounds for the navigation function or the content that is reproduced.

The radio communication interface 933 supports any cellular communication scheme (such as LTE and LTE-Advanced), and performs wireless communication. The radio communication interface 933 may typically include, for example, a BB processor 934 and an RF circuit 935. The BB processor 934 may perform, for example, encoding/decoding, modulating/demodulating and multiplexing/demultiplexing, and perform various types of signal processing for wireless communication. The RF circuit 935 may include, for example, a mixer, a filter and an amplifier, and transmits and receives wireless signals via the antenna 937. The radio communication interface 933 may also be a chip module having the BB processor 934 and the RF circuit 935 integrated thereon. The radio communication interface 933 may include multiple BB processors 934 and multiple RF circuits 935, as shown in FIG. 15. Although FIG. 15 shows the example in which the radio communication interface 933 includes the multiple BB processors 934 and the multiple RF circuits 935, the radio communication interface 933 may also include a single BB processor 934 and a single RF circuit 935.

Furthermore, in addition to a cellular communication scheme, the radio communication interface 933 may support another type of wireless communication scheme such as a short-distance wireless communication scheme, a near field communication scheme, and a wireless LAN scheme. In this case, the radio communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the radio communication interface 933.

Each of the antennas 937 includes a single or multiple antenna elements (such as multiple antenna elements included in an MIMO antenna), and is used by the radio communication interface 933 to transmit and receive wireless signals. As shown in FIG. 15, the car navigation apparatus 920 may include the multiple antennas 937. Although FIG. 15 shows the example in which the car navigation apparatus 920 includes the multiple antennas 937, the car navigation apparatus 920 may also include a single antenna 937.

Furthermore, the car navigation apparatus 920 may include the antenna 937 for each wireless communication scheme. In this case, the antenna switches 936 may be omitted from the configuration of the car navigation apparatus 920.

The battery 938 supplies power to the blocks of the car navigation apparatus 920 shown in FIG. 15 via feeder lines that are partially shown as dash lines in FIG. 15. The battery 938 accumulates power supplied from the vehicle.

In the car navigation apparatus 920 shown in FIG. 15, a transceiver of the electronic apparatus 100 may be implemented by the radio communication interface 912. At least a part of functions may be implemented by the processor 901 or the auxiliary controller 919. For example, the processor 901 or the auxiliary controller 919 may select an appropriate MA signature based on the communication system numerology for the user equipment and implement shared transmission of a group of user equipment by performing functions of the determination unit 101 and the transmission unit 102.

The technology of the present disclosure may also be implemented as an in-vehicle system (or a vehicle) 940 including one or more blocks of the car navigation apparatus 920, the in-vehicle network 941 and a vehicle module 942. The vehicle module 942 generates vehicle data (such as a vehicle speed, an engine speed, and failure information), and outputs the generated data to the in-vehicle network 941.

The basic principle of the present disclosure has been described above in conjunction with particular embodiments. However, as can be appreciated by those ordinarily skilled in the art, all or any of the steps or components of the method and apparatus according to the disclosure can be implemented with hardware, firmware, software or a combination thereof in any computing device (including a processor, a storage medium, etc.) or a network of computing devices by those ordinarily skilled in the art in light of the disclosure of the disclosure and making use of their general circuit designing knowledge or general programming skills.

Moreover, the present disclosure further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present disclosure. The memory medium includes but is not limited to soft disc, optical disc, magnetic optical disc, memory card, memory stick and the like.

In the case where the present disclosure is realized with software or firmware, a program constituting the software is installed in a computer with a dedicated hardware structure (e.g. the general computer 1600 shown in FIG. 16) from a storage medium or network, wherein the computer is capable of implementing various functions when installed with various programs.

Figure 16:
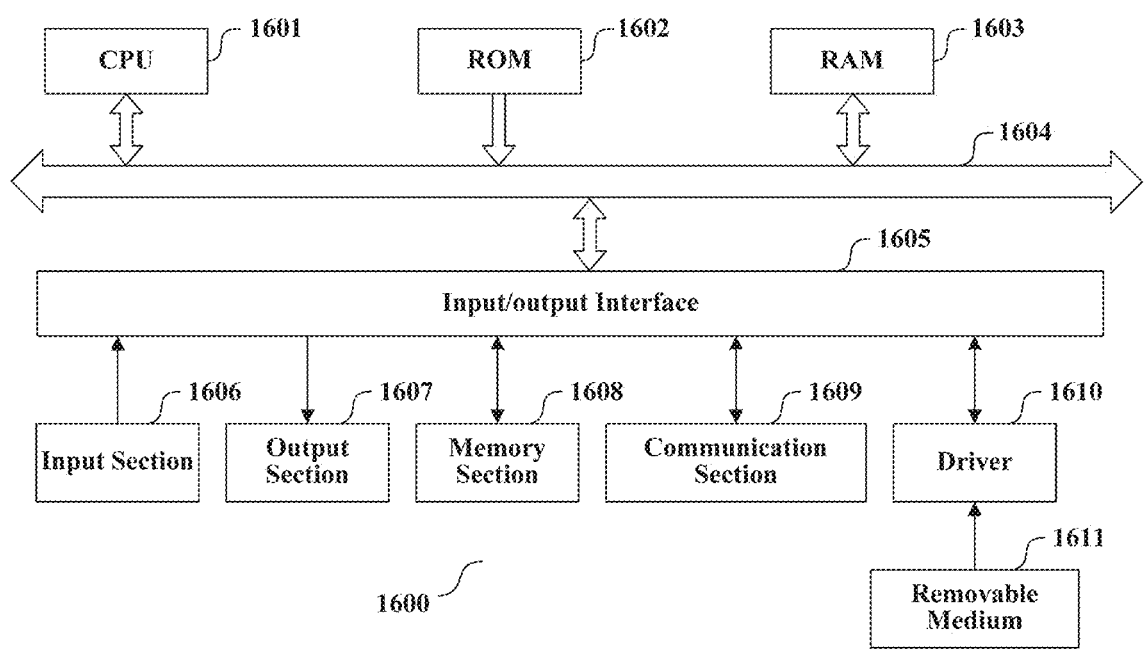
FIG. 16 is a block diagram of an exemplary block diagram illustrating the structure of a general purpose personal computer capable of realizing the method and/or device and/or system according to the embodiments of the present disclosure.

In FIG. 16, a central processing unit (CPU) 1601 executes various processing according to a program stored in a read-only memory (ROM) 1602 or a program loaded to a random access memory (RAM) 1603 from a memory section 1608. The data needed for the various processing of the CPU 1601 may be stored in the RAM 1603 as needed. The CPU 1601, the ROM 1602 and the RAM 1603 are linked with each other via a bus 1604. An input/output interface 1605 is also linked to the bus 1604.

The following components are linked to the input/output interface 1605: an input section 1606 (including keyboard, mouse and the like), an output section 1607 (including displays such as a cathode ray tube (CRT), a liquid crystal display (LCD), a loudspeaker and the like), a memory section 1608 (including hard disc and the like), and a communication section 1609 (including a network interface card such as a LAN card, modem and the like). The communication section 1609 performs communication processing via a network such as the Internet. A driver 1610 may also be linked to the input/output interface 1605, if needed. If needed, a removable medium 1611, for example, a magnetic disc, an optical disc, a magnetic optical disc, a semiconductor memory and the like, may be installed in the driver 1610, so that the computer program read therefrom is installed in the memory section 1608 as appropriate.

In the case where the foregoing series of processing is achieved through software, programs forming the software are installed from a network such as the Internet or a memory medium such as the removable medium 1611.

It should be appreciated by those skilled in the art that the memory medium is not limited to the removable medium 1611 shown in FIG. 16, which has program stored therein and is distributed separately from the apparatus so as to provide the programs to users. The removable medium 1611 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 1602 and the memory section 1608 in which programs are stored, and can be distributed to users along with the device in which they are incorporated.

To be further noted, in the apparatus, method and system according to the present disclosure, the respective components or steps can be decomposed and/or recombined. These decompositions and/or recombinations shall be regarded as equivalent solutions of the disclosure. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the present disclosure have been described above in detail in connection with the drawings, it shall be appreciated that the embodiments as described above are merely illustrative rather than limitative of the present disclosure. Those skilled in the art can make various modifications and variations to the above embodiments without departing from the spirit and scope of the present disclosure. Therefore, the scope of the present disclosure is defined merely by the appended claims and their equivalents.

The invention claimed is:

1. An electronic apparatus configured to operate as a user equipment in a wireless communications network, comprising:
 processing circuitry, configured to:
  receive, from a base station, information about a non-orthogonal multiple access (NOMA)$signature pool available to a group of user equipments, the group of user equivalents including the user equipment,
  wherein the NOMA signature pool is divided into a plurality of non-overlapping sub signature pools,
  wherein each of the plurality of non-overlapping sub signature pools comprises plural non-overlapping sets of multiple access time frequency resources that may be shared by multiple user equipments,
  wherein a first sub signature pool of the plurality of non-overlapping sub signature pools is characterized by a first communication characteristic, and a second sub signature pool of the plurality of non-overlapping sub signature pools is characterized by a second communication characteristic different from the first communication characteristic,
  wherein each of the plurality of sub signature pools includes plural signatures having a corresponding communication system numerology;
  determine a signature, from among plural signatures of the NOMA$signature pool, to a user equipment; and
  communicate with another communication device in accordance with the assigned signature,
  wherein the signature is determined to be a signature in the first sub signature pool or in the second sub signature pool based on a user equipment specific communication characteristic matching one of the first communication characteristic or the second communication characteristic, respectively,
  wherein the user equipment specific communication characteristic comprises at least one of:
   a sub-carrier spacing,
   a length of an orthogonal frequency division multiplexing symbol,
   a length of a cyclic prefix,
   a length of a modulation sequence, and
   a length of an interleaver.

2. The electronic apparatus according to claim 1, wherein, a number of the divided sub signature pools is equal to a number of categories of sub-carrier spacing supported by a communication system that includes the electronic apparatus and the user equipment.

3. The electronic apparatus according to claim 1, wherein, the processing circuitry is configured to randomly determine the signature to be used for the user equipment.

4. The electronic apparatus according to claim 3, wherein, the processing circuitry is further configured to notify a base station of information of the determined signature to be used for the user equipment via a physical uplink control channel.

5. The electronic apparatus according to claim 1, wherein, the processing circuitry is configured to determine the signature to be used for the user equipment based on an identifier of the user equipment.

6. The electronic apparatus according to claim 1, wherein, the signature to be used for the user equipment is determined by a base station, and the processing circuitry is configured to determine the signature based on one of the following signaling from the base station: radio resource control signaling, media access control signaling, or L1 signaling.

7. The electronic apparatus according to claim 1, wherein, the processing circuitry is configured to select a back-off number in a case that the signature determined for the user equipment is the same as a signature determined for another user equipment assigned to the same sub signature pool.

8. The electronic apparatus according to claim 1, wherein, the processing circuitry is configured to, in the case that the signature determined for the user equipment is the same as a signature determined for another user equipment assigned to the same sub signature pool, acquire from a base station information of dedicated time frequency resources allocated by the base station for the user equipment which are different from the multiple access time frequency resources.

9. A method performed by an electronic apparatus configured to operate as a user equipment in a wireless communications network, the method comprising:

receiving, from a base station, information about a non-orthogonal multiple access (NOMA)$signature pool available to a group of user equipments, the group of user equipments including the user equipment, wherein the NOMA signature pool is divided into a plurality of non-overlapping sub signature pools, wherein each of the plurality of non-overlapping sub signature pools comprises plural non-overlapping sets of multiple access time frequency resources that may be shared by multiple user equipments, wherein a first sub signature pool of the plurality of non-overlapping sub signature pools is characterized by a first communication characteristic, and a second sub signature pool of the plurality of non-overlapping sub signature pools is characterized by a second communication characteristic different from the first communication characteristic, wherein each of the plurality of sub signature pools includes plural signatures having a corresponding communication system numerology;

determining a signature, from among plural signatures of the NOMA$signature pool, to a user equipment; and communicating with another communication device in accordance with the assigned signature, wherein the signature is determined to be a signature in the first sub signature pool or in the second sub signature pool based on a user equipment specific communication characteristic matching one of the first communication characteristic or the second communication characteristic, respectively, wherein the user equipment specific communication characteristic comprises at least one of:
  a sub-carrier spacing,
  a length of an orthogonal frequency division multiplexing symbol,
  a length of a cyclic prefix,
  a length of a modulation sequence, and
  a length of an interleaver.

10. The method according to claim 9, wherein a number of the divided sub signature pools is equal to a number of categories of sub-carrier spacing supported by a communication system that includes the electronic apparatus and the user equipment.

11. The method according to claim 9, further comprising:
  randomly determining the signature to be used for the user equipment.

12. The method according to claim 11, further comprising:
  notifying a base station of information of the determined signature to be used for the user equipment via, a physical uplink control channel.

13. The method according to claim 9, further comprising:
  determining the signature to be used for the user equipment based on an identifier of the user equipment.

14. The method according to claim 9, wherein the signature to be used for the user equipment is determined by a base station, and the method further comprises determining the signature based on one of the following signaling from the base station: radio resource control signaling, media access control signaling, or L1 signaling.

15. The method according to claim 9, further comprising:
  selecting a back-off number in a case that the signature determined for the user equipment is the same as a signature determined for another user equipment assigned to the same sub signature pool.

16. The method according to claim 9, further comprising:
  in the case that the signature determined for the user equipment is the same as a signature determined for another user equipment assigned to the same sub signature pool, acquiring from a base station information of dedicated time frequency resources allocated by the base station for the user equipment which are different from the multiple access time frequency resources.

\* \* \* \* \*